March 26, 1957

D. M. KABAK 2,786,968

CIRCUIT MEANS FOR AUTOMATICALLY VARYING
CURRENT THROUGH A LOAD

Filed March 16, 1953

INVENTOR.
DANIEL M. KABAK
BY Mock & Blum
ATTORNEYS

March 26, 1957 D. M. KABAK 2,786,968
CIRCUIT MEANS FOR AUTOMATICALLY VARYING
CURRENT THROUGH A LOAD
Filed March 16, 1953 2 Sheets-Sheet 2

INVENTOR.
DANIEL M. KABAK
BY Mock & Blum
ATTORNEYS

United States Patent Office 2,786,968
Patented Mar. 26, 1957

2,786,968

CIRCUIT MEANS FOR AUTOMATICALLY VARYING CURRENT THROUGH A LOAD

Daniel M. Kabak, Yonkers, N. Y.

Application March 16, 1953, Serial No. 342,500

20 Claims. (Cl. 315—284)

My invention is in the field of the electrical arts and relates to improved circuits and means for varying the flow of current through a load.

In particular, my invention relates to circuits and means for gradually reducing the current through a load from an initial steady value to a selected minimum value; for gradually increasing the current through a load from an initial minimum value to a selected steady value; and for varying the current through a load in a cyclic manner.

Circuits for gradually reducing the current through a load have been used in the dimming of incandescent lamps, as one example. Circuits for gradually increasing the current through a load have been used to limit current inrush in the starting of electric motors and to limit torque in the gradual acceleration of motors, as examples. Circuits for cyclically varying load current have been used to vary individually the intensity of incandescent lamps of the three primary colors in novelty lighting systems, as one example.

Devices and circuits previously used in such applications have frequently been bulky; have required excessive manual manipulation of control elements; have required the use of rheostats drawing excessive power, the use of motor-driven or the use of multi-stage contact devices; or have had other disadvantages.

An important object of my invention is to provide circuits and means for varying the flow of current through a load which can be actuated by simple means, which eliminate the use of the prior art devices and which are of simple construction.

In varying the flow of current through a load, I make use of a saturable reactor of the type described in "Electronic Transformers and Circuits," page 207, by Reuben Lee (John Wiley, 1947). In one construction, the saturable reactor comprises a core which has a central leg and two outer legs. A direct current coil is mounted on the central leg and is supplied with direct current of a selected value so as to produce a selected direct current magnetic flux in the outer legs. A pair of reactance coils are respectively mounted on the respective outer legs and are connected in series or in parallel. Said reactance coils are adapted to be together connected in series or in any other suitable manner with a load across a source of alternating current.

The reactance of the reactance coils, and hence the current through the load, depends upon the direct current magnetic flux in the outer legs of the core. For example, if the direct current supplied to the direct current coil is sufficient to provide a direct current magnetic flux in the core which substantially saturates same, the reactance of the reactance coils is at a minimum. If the direct current is of zero value, the reactance of the reactance coils is at a maximum. By varying the direct current between these two limits, it is possible to regulate the reactance of the reactance coils.

An important feature of my invention resides in the provision of improved means for varying the current supplied to the direct current coil, whereby to vary the reactance of the reactance coils and hence to vary the current through the load. Said means for varying the current supplied to said direct current coil include one or more resistors whose resistances vary with change in temperature, such resistors being hereinafter designated as temperature-sensitive resistors. I prefer to use temperature-sensitive resistors having relatively high temperature coefficients of resistance.

Temperature-sensitive resistors which are suitable for my purposes and which are sufficiently chemically and electrically stable under the desired operating conditions are described in "Thermistors as Components Open Product Design Horizons," by K. P. Dowell (Electrical Manufacturing, August 1948). The resistors described therein have negative temperature coefficients of resistance of between 3.0 and 4.4 percent, inclusive, per degree centigrade at 25 degrees centigrade. Other suitable temperature-sensitive resistors are described in Bulletin GR–3 of the Globar Division of The Carborundum Company, Niagara Falls, New York, and are designated therein as "Type F." These "Type F" resistors have negative temperature coefficients of resistance of between 1.0 and 2.2 percent, inclusive, per degree centigrade at 25 degrees centigrade.

As will be apparent from the detailed description which follows, I can use temperature-sensitive resistors which have negative temperature coefficients of resistance which are different from those specified above, as well as temperature-sensitive resistors which have positive coefficients of resistance.

By connecting a suitable temperature-sensitive resistor in a suitable circuit with the direct current coil of a saturable reactor of the above-described type, I can reduce the current through a load connected in an alternating current circuit with the reactance coils of said saturable reactor from a selected initial maximum to a selected minimum at a selected rate of decay.

In another embodiment, I provide a circuit which includes a saturable reactor of the above-described type and a temperature-sensitive resistor, whereby the current through the load is increased from a selected initial minimum to a selected maximum at a selected rate of increase.

By the use of modified circuits which incorporate features of both of the above-mentioned circuits, I can vary the current through the load in a cyclic manner between a selected minimum and a selected maximum value.

Current control devices utilizing these circuits can be made extremely compactly and at relatively low cost.

While I have indicated various applications and uses of my invention, it will be apparent that other uses and applications of my invention are possible. For example, the circuits which I have developed are of use in varying the intensity of fluorescent lamps. Said circuits may also be used, with suitable modifications, in three-phase power supplies of various devices.

Other objects and advantages of my invention will become apparent from the following description, in conjunction with the annexed drawings, in which preferred embodiments are disclosed.

Figure 1:
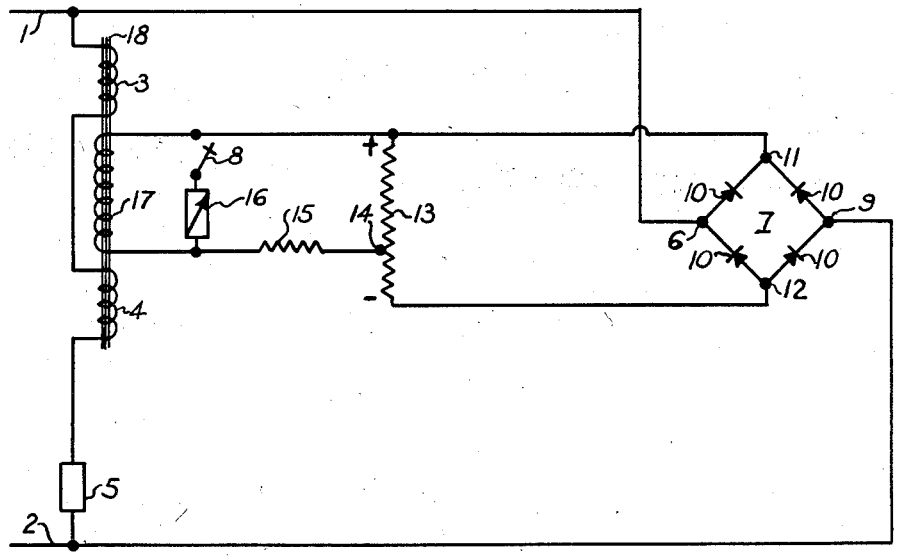
Fig. 1 is a schematic diagram of an electric circuit in accordance with my invention for reducing the load current from its initial value.

All of my circuits described herein utilize a single-phase source of alternating current, but it will be apparent that my invention is also applicable to multiphase current systems.

All of the views show a pair of lines 1 and 2, which are adapted to be connected through suitable fuses or the like (not shown) to a suitable source of alternating current (not shown). All of the views show a saturable reactor which has a core 18, a direct current coil 17 and two reactance coils 3 and 4 being wound on said core 18. Said saturable reactor is shown schematically and is only illustrative of the aforementioned type of reactor in which the current in the direct current coil controls the direct current magnetic flux of the core and hence controls the reactance of the reactance coils. In this example, but without limitation, the saturable reactor is shown as having two such reactance coils 3 and 4 connected in series with load 5 between lines 1 and 2.

In most applications of any of the embodiments of my invention shown herein, load 5 is primarily resistive in nature. However, the circuits illustrated herein may also be used when the load is not primarily resistive in nature.

It will be apparent that suitable additional circuit elements, well known in the art, may be connected across lines 1 and 2, if necessary, in order to compensate for poor power factor of the circuit elements 3, 4 and 5.

Figure 2:
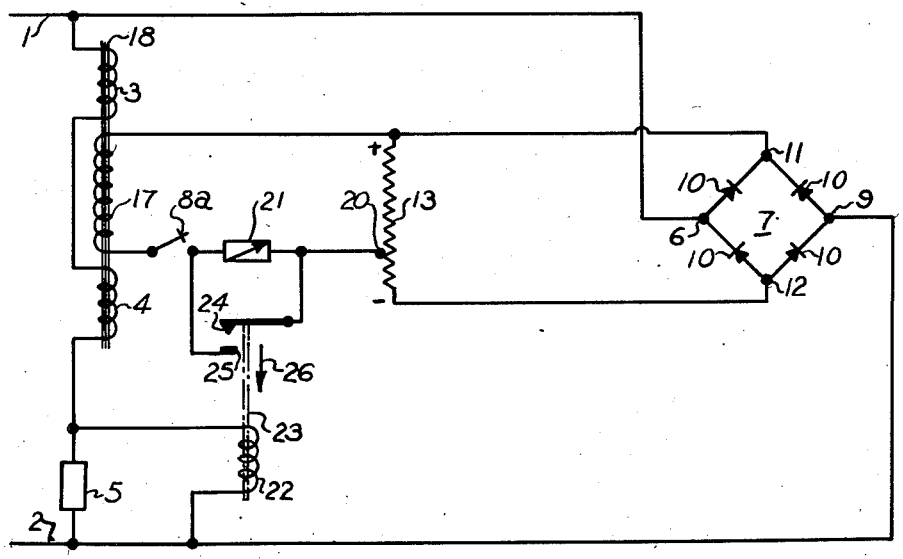
Fig. 2 is a schematic diagram of another electric circuit in accordance with my invention for increasing the load current from its initial value.
Figure 3:
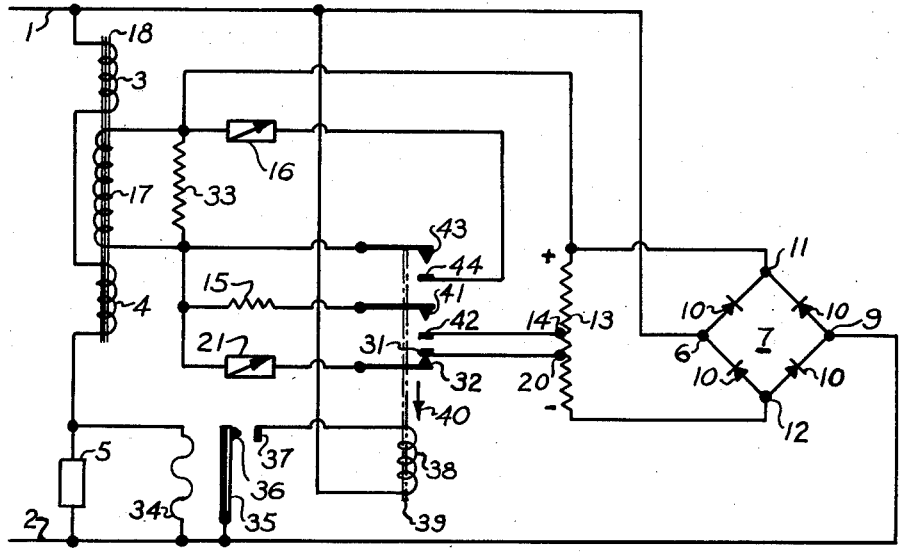
Fig. 3 is a schematic diagram of a third electric circuit in accordance with my invention for cyclically varying the load current.

Figs. 1, 2 and 3 show a rectifier 7, which is the source of direct current for the direct current coil 17 of the saturable reactor. Any suitable source of direct current for coil 17 may be provided, and the invention is not limited to the rectifier shown, said rectifier being shown merely by way of example. As shown diagrammatically in the drawings, rectifier 7 comprises four diodes 10 which are connected together in a conventional bridge circuit having input terminals 6 and 9 and output terminals 11 and 12. Line 1 is connected to terminal 6, and line 2 is connected to terminal 9, whereby an alternating voltage is impressed upon said input terminals 6 and 9. Diodes 10 respectively pass current unidirectionally in such a manner that output terminal 11 is positive, and output terminal 12 is negative, and rectifier 10 thereby serves as a source of direct current at said output terminals 11 and 12.

In Figs. 1, 2 and 3, a resistive voltage divider 13 is preferably connected across the rectifier output terminals 11 and 12, the resulting polarity of said voltage divider 13 being indicated by the plus and minus signs of the drawings. In Figs. 1, 2 and 3, the positive terminal of voltage divider 13 and a suitable tap of said voltage divider 13 are connected through a circuit which includes one or more temperature-sensitive resistors to the respective terminals of coil 17 whereby to pass a direct current therethrough. The circuit varies in each of the embodiments, depending upon the manner in which it is desired to vary the current through load 5.

While in all the embodiments disclosed herein, the temperature-sensitive resistors are described as having negative temperature coefficients of resistance, it will be apparent from the detailed description of each embodiment that other embodiments of my invention are possible in which the temperature-sensitive resistors have positive temperature coefficients of resistance.

*First embodiment—Fig. 1*

In this embodiment means are provided for decreasing the current through load 5.

In this embodiment, the positive terminal of voltage divider 13 is connected to one terminal of the direct current coil 17 of the saturable reactor. A selected tap 14 of said voltage divider 13 is connected through resistance 15 to the other terminal of said coil 17, whereby a selected proportion of the potential drop across voltage divider 13 may be impressed upon coil 17.

One terminal of a temperature-sensitive resistor 16 is connected to one terminal of coil 17. The other terminal of said resistor 16 is connected through an optional switch 8 to the other terminal of coil 17. Switch 8 may be manually operable, operable by a timing mechanism, or operable by any other suitable means. Resistor 16 has a negative temperature coefficient of resistance.

In describing the operation of the circuit of Fig. 1, it will be assumed that switch 8 is initially open, and that resistor 16 is initially at ambient temperature. The initial voltage drop across coil 17 has a selected value which depends upon the potential difference between the positive terminal of voltage divider 13 and tap 14, and upon the value of resistance 15 and the value of the resistance of coil 17. Said selected initial voltage drop across coil 17 results in an initial current through coil 17 of a selected maximum value.

As a result of the initial selected current through coil 17, an initial selected direct current magnetic field is produced in core 18 and a resulting initial selected maximum direct current magnetic flux is produced in core 18.

As the result of the selected initial magnetic flux in core 18, resulting from the initial selected direct current through coil 17, the reactance of coils 3 and 4 to the alternating current supplied thereto has an initial selected minimum value, and the current through load 5 has an initial selected maximum value. These initial operating conditions may be maintained during steady use of load 5, which may comprise a bank of incandescent lamps as one example. I use a saturable reactor in which relatively small power is consumed by the coils thereof in order to maintain the initial maximum current through load 5, as compared to the resulting power consumed by said load 5.

When it is desired to reduce the current through load 5, it is only necessary to close switch 8, which may be done by any suitable means. As a result, temperature-sensitive resistor 16 is connected in parallel with coil 17. The combined resistance of resistor 16 and coil 17 is less than the resistance of coil 17. Therefore, the voltage drop across coil 17 decreases to a second selected value, and the current through coil 17 decreases to a second selected value. Preferably, the resistance of resistor 16 at the time of closing switch 8, relative to the resistance of coil 17, is of such value that the decrease in the voltage drop across coil 17 is insignificant.

As a result of the passage of current through resistor 16, it is gradually heated above ambient temperature, and its resistance gradually drops from its initial value. As a result, the combined resistance of resistor 16 and coil 17 gradually drops, the voltage drop across coil 17 decreases below its second selected value and the current through coil 17 decreases below its second selected value.

As a result of the decrease in the current through coil 17, the direct current magnetic field in core 18 drops, the direct current magnetic flux in core 18 drops, the reactance of coils 3 and 4 to the alternating current supplied thereto rises and the current through load 5 decays. The resistance of resistor 16 may drop to a selected terminal value, whereby the current through load 5 decays to a selected terminal value.

I prefer to use a circuit and resistor 16 of such values that the resistance of resistor 16 drops to its selected terminal value within a time interval which is suitable for the particular application being made of the circuit. For example, if load 5 is a bank of incandescent lamps, the suitable time interval for dimming the lamps may be several seconds, although another time interval may also be suitable. It will be apparent that the desired drop in the resistance of resistor 16 within the desired time interval will require a suitable relationship between a number of factors which include the initial ambient temperature of the device, the rate of dissipation of the heat emitted by resistor 16 as the result of the passage of current therethrough, the initial potential drop across resistor 16, and the relationship between the resistance of resistor 16 and the temperature thereof for any temperature of resistor 16 within the operating range of temperatures thereof, respectively corresponding to its initial resistance and its desired terminal resistance.

I have found that these factors are satisfactorily related when I use a temperature-sensitive resistor of a type described in either of the previously cited publications, or equivalent type, having a negative temperature coefficient of resistance of 1.0 percent, or greater per degree centigrade at an ambient temperature of 25 degrees centigrade. However, other temperature-sensitive resistors can also be used.

When it is desired to restore the initial current through load 5, it is only necessary to open switch 8, which may be done by any suitable means. Preferably, resistor 16 is allowed to cool to ambient temperature before switch 8 is again closed.

It will be apparent from the description of the second embodiment that optionally, after the resistance of resistor 16 drops to its terminal value, resistor 16 may be shorted out by the contacts of a suitable relay connected in a suitable manner across the load circuit, so as to permit resistor 16 to cool while maintaining low current through load 5.

Second embodiment—Fig. 2

In this embodiment, means are provided for increasing the current through load 5.

In this embodiment, the positive terminal of voltage divider 13 is connected to one terminal of coil 17. Voltage divider 13 is tapped at 20 at a point which may differ from the point of tap 14 in the first embodiment. Said tap 20 is connected through a temperature-sensitive resistor 21 and switch 8a to the other terminal of coil 17. Resistor 21 preferably has similar characteristics to those of resistor 16 of the first embodiment. In particular, resistor 21 has a negative temperature coefficient of resistance in this embodiment. Switch 8a is optionally similar to switch 8 of the first embodiment.

The coil 22 of a magnetic relay is connected in parallel with load 5. The relay armature 23 controls the movement of a movable contact 24 relative to a fixed contact 25. Said contacts 24 and 25 are respectively connected to the opposite ends of resistor 21. Contacts 24 and 25 are normally spaced from each other. When the current through coil 22 rises above a selected threshold value, armature 23 is moved in the direction of arrow 26 to move contact 24 into contact with contact 25, thereby shorting resistor 21.

The operation of this circuit will be described in slightly less detail than the operation of the circuit of Fig. 1, since it will be apparent that in a number of instances similar operating factors apply to each circuit.

In describing the operation of the circuit of Fig. 2, it will be assumed that switch 8a is initially open, and that resistor 21 is initially at ambient temperature. Initially, therefore, no current flows through coil 17, and the reactance of coils 3 and 4 has maximum value. Initially, the current through load 5 has a minimum selected value.

The initial voltage drop across load 5, resulting from the initial current therethrough, results in an initial current through relay coil 22 which is too low to permit the closing of contacts 24 and 25.

When it is desired to increase the current through load 5, switch 8a is closed by any suitable means. The resulting selected current flow through coil 17 depends upon the potential difference between the positive terminal of voltage divider 13 and tap 20 and the initial resistance of resistor 21. Said selected current flow through coil 17 results in a second selected current flow through load 5 which is greater than the initial current flow therethrough. Preferably, said resulting current flow through coil 17 is quite small when switch 8a is first closed.

As a result of the passage of current through resistor 21, it is gradually heated above ambient temperature, and its resistance gradually drops from its initial value.

As the resistance of resistor 21 drops, the current through coil 17 increases, and the resulting direct current magnetic flux in core 18 increases. The reactances of coils 3 and 4 drop, and the current through load 5 increases.

As the current through load 5 rises, the voltage drop across load 5 rises, and the resulting current through coil 22 rises until it reaches the threshold value at which contacts 24 and 25 are closed. Contacts 24 and 25 close when the current through load 5 reaches a selected terminal value. When contacts 24 and 25 are closed, maximum current flows through coil 17, and the current through load 5 reaches and remains at a maximum value. However, no current flows through resistor 21, and resistor 21 can cool to ambient temperature.

When it is desired to reduce the current through load 5 to its initial value, it is only necessary to open switch 8a, by any suitable means.

In one application of this embodiment of my invention, load 5 may be a motor. The acceleration current of the motor may be increased from an initial minimum value to a selected terminal value at a selected time rate of increase, thereby uniformly accelerating the motor to its rated speed. Resistor 21 is shorted out during the time that the motor is running at its rated speed, so that resistor 21 cools to ambient temperature. If the motor stops for any reason corresponding to opening the circuit 3, 4, 5 contacts 24 and 25 immediately open. If the motor is then started again, resistor 21 having cooled, only the selected low starting current is supplied to the motor.

Optionally, the relay may be omitted.

Third embodiment—Fig. 3

In this embodiment the current through load 5 is varied cyclically.

The circuit of Fig. 3 embodies features of both Fig. 1 and Fig. 2. In Fig. 3, the positive terminal of voltage divider 13 is connected to one terminal of coil 17. Tap 14 of said voltage divider 13 is connected through normally open contacts 42 and 41 through resistor 15 to the other terminal of said coil 17. One terminal of resistor 16 is connected to one terminal of coil 17, and the other terminal of resistor 16 is connected through normally open contacts 44 and 43 to the other terminal of coil 17. This is similar to the circuit of Fig. 1.

Also in Fig. 3, it being noted as stated in the previous paragraph that the positive terminal of voltage divider 13 is connected to one terminal of coil 17, the tap 20 of said voltage divider 13 is connected through normally closed contacts 31 and 32 and resistor 21 to the other terminal of coil 17. This is similar to the circuit of Fig. 2.

In addition, resistance 33 is connected across coil 17. Also, means are provided for controlling the opening and closing of the respective switch contacts 31, 32; 41, 42; and 43, 44. Said control means preferably include a thermal-type time delay relay, or other suitable device, connected across load 5, said thermal-type relay being of any suitable type.

In the embodiment shown in the drawing, said thermal-type relay comprises a heater coil 34 connected across load 5. Said relay also comprises a bimetal strip 35 connected to line 2 and adapted to be heated by the heat emitted by coil 34. Said strip carries a contact 36. Line 1 is connected through the coil 38 of a magnetic relay and the normally open contacts 37 and 36 and strip 35 to said line 2. Therefore, coil 38 is energized when contacts 36 and 37 are closed.

Relay coil 38 has an armature 39, which carries contacts 32, 41 and 43, the contacts 31, 42 and 44 being fixed. When coil 38 is energized, armature 39 is moved in the direction of arrow 40 and opens contacts 31, 32 and closes contacts 41, 42 and 43, 44.

In describing the operation of the circuit of Fig. 3, it will be assumed that contacts 36 and 37 are initially open, and that resistor 21 is initially at ambient temperature. The circuit then corresponds to the circuit of Fig. 2 (with switch 8a closed), with the addition of the high resistance 33 across coil 17. The resistance of resistor 21 is at its initial maximum value, the current through coil 17 is at an initial, selected relatively low value and the current through load 5 is at an initial, selected relatively low value.

As a result of the passage of current through the temperature-sensitive resistor 21, and the heating thereof, the current through coil 17 rises and the current through load 5 rises substantially as described in the case of the circuit of Fig. 2.

As the current through load 5 rises, the voltage drop across load 5 rises, and the current through heater coil 34 rises. After a suitable time delay, and after the current through load 5 has reached a selected maximum value, bimetal strip 35 is sufficiently heated by the heat emitted by coil 34 to close contacts 36 and 37.

As a result of the closing of contacts 36 and 37, relay coil 38 is energized, and contacts 31 and 32 are opened. Simultaneously with the opening of contacts 31 and 32, contacts 41 and 42 are closed and contacts 43 and 44 are closed. During the short time interval in which all of the contacts controlled by coil 38 are open, excess energy in the circuit of coil 17 is discharged across resistance 33, thereby minimizing arcing across the contacts. The time constant of the circuit of coil 17 is such as to regulate the rate of said energy discharge so as to maintain the current through coil 17 substantially constant during this switching operation. The circuit then corresponds to the circuit of Fig. 1 (switch 8 being closed), with the addition of the high resistance 33 across coil 17.

It is noted that at this point in the cycle, resistor 16 is at ambient temperature. While resistor 16 is in circuit, resistor 21 cools to ambient temperature. The cooling rate of resistor 21 is faster than its heating rate while in circuit.

When resistor 16 is heated, as the result of the passage of current therethrough, the current in coil 17 drops and the current through load 5 dops substantially as in the case of the circuit of Fig. 1. As a result, the current through heater coil 34 drops, and strip 35 cools. After a suitable time delay, and after the current through load 5 has reached a selected minimum value, strip 35 cools sufficiently so that contacts 36 and 37 open, and the switch contacts return to their initial positions. During the short time interval in which all of the switch contacts controlled by relay coil 38 are open, resistance 33 serves substantially the same purposes as stated in a previous paragraph.

While resistor 21 is in circuit, resistor 16 cools to ambient temperature. The cooling rate of resistor 16 is greater than its heating rate while in circuit.

It will be apparent that by suitable design of the circuit components of Fig. 3, it is possible to vary the current through load 5 in a cyclic manner. For example, in one possible cycle, the current through load 5 rises from an initial minimum value at a selected time rate to a maximum value, remains at its maximum value for a selected period of time, decays to its minimum value at a selected time rate and remains at said minimum value for a selected period of time. The current through load 5 may be maintained at its maximum value for a desired time with resistor 21 in circuit, by maintaining the current through coil 17 at such a value for said desired time that the resulting direct current magnetic flux in core 18 substantially saturates same. The current through load 5 may be maintained at its minimum value for a desired time, with resistor 16 in circuit, by permitting the resistance of resistor 16 to remain at such a value for said desired time as effectively to short out coil 17.

Figure 4:
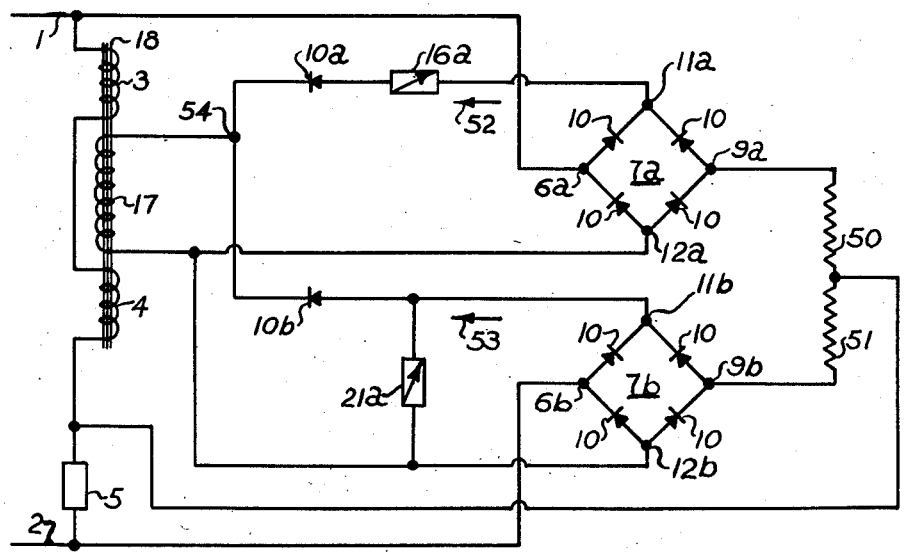
Fig. 4 is a schematic diagram of a fourth electric circuit in accordance with my invention for cyclically varying the load current. In this embodiment, there are no moving parts.

Fourth embodiment—Fig. 4

In this embodiment, the current through load 5 is varied cyclically. An important feature of this embodiment is that all moving parts are eliminated.

In this embodiment, a first rectifier 7a, which is similar to rectifier 7, has an input terminal 6a which is connected to line 1, and another input terminal 9a which is connected through resistance 50 to the junction between reactance coil 4 and load 5. As a result, the input voltage of rectifier 7a is proportional to the voltage drop across coils 3 and 4. Rectifier 7a has an output terminal 12a which is connected to one terminal of coil 17. Temperature-sensitive resistor 16a and diode 10a are connected in series between the other output terminal 11a of rectifier 7a and the other terminal of coil 17. The junction between diode 10a and said other terminal of coil 17 is designated as 54.

The direction of flow of the current output of rectifier 7a is indicated by arrow 52. Diode 10a permits current to flow therethrough only in the direction of said arrow 52. Any suitable device may be used in place of diode 10a.

In this embodiment, a second rectifier 7b, which is similar to rectifier 7a, has an input terminal 6b which is connected to line 2, and another input terminal 9b which is connected through resistance 51, which is similar to resistance 50, to the junction between coil 4 and load 5. As a result, the input voltage of rectifier 7b is proportional to the voltage drop across load 5. Temperature-sensitive resistor 21a is connected across the output terminals 11b and 12b of rectifier 7b. Terminal 11b is connected through diode 10b to junction 54, and terminal 12b is connected to the terminal of coil 17 to which terminal 12a is connected.

The direction of flow of the current output of rectifier 7b is indicated by arrow 53. Diode 10b is similar to diode 10a. Current can flow through diode 10b only in the direction of said arrow 53.

Resistors 16a and 21a have negative temperature coefficients of resistance.

In the operation of the circuit of Fig. 4, two potential differences are applied to coil 17, as measured between junction 54 and the joined terminals 12a and 12b. The first of said potential differences supplied to coil 17 is equal to the output voltage of rectifier 7a less the voltage drop across resistor 16a. Since the input voltage of rectifier 7a is proportional to the voltage drop across reactance coils 3 and 4, as stated above, it will be apparent that the first of said potential differences applied to coil 17 is proportional to the voltage drop across coils 3 and 4. The second of said potential differences applied to coil 17 is equal to the output voltage of rectifier 7b. Since the input voltage of rectifier 7b is proportional to the voltage drop across load 5, as stated above, it will be apparent that the second of said potential differences applied to coil 17 is proportional to the voltage drop across load 5. When the first potential difference applied to coil 17 exceeds the second potential difference applied thereto, the output current of rectifier 7a flows through resistor 16a and coil 17 between terminals 11a and 12a; and the output current of rectifier 7b flows only through resistor 21a between terminals 11b and 12b, and is blocked from flowing through diode 10b. When the second potential difference applied to coil 17 exceeds the first potential difference applied thereto, the output current of rectifier 7b flows through resistor 21a and coil 17 in parallel, and diode 10a blocks any output current of rectifier 7a.

In describing a cycle of operation of the circuit of Fig. 4, it will be assumed that initially the first potential drop applied to coil 17 slightly exceeds the second potential drop applied thereto. Initially, therefore, the output current of rectifier 7a flows through resistor 16a and coil 17 between terminals 11a and 12a; and the output current of rectifier 7b flows only through resistor 21a between terminals 11b and 12b. Initially, as will be more fully apparent from the following description, resistor 16a is at substantially ambient temperature; and the temperature of resistor 21a is intermediate its maximum and minimum temperatures for the cycle of operations. Initially, the current through coil 17 is at a first selected minimum value for the cycle of operations. Initially, the current through load 5 is at a first selected minimum value for the cycle of operations.

Initially, the circuit of Fig. 4 is similar to that of Fig. 2. As resistor 16a is heated above ambient temperature by the passage of current therethrough, its resistance drops. The current through coil 17 increases from its initial value. The reactance of coils 3 and 4 decreases from its initial value. The current through load 5 increases from its initial minimum value. The voltage drop across coils 3 and 4 decreases, and the voltage output of rectifier 7a decreases. The voltage drop across resistor 16a also decreases. The voltage drop across load 5 increases, and the voltage output of rectifier 7b increases.

It will be apparent that by suitable design of all circuit components, and by suitable regulation of the heat dissipation of resistor 16a, it is possible to increase the load current from its selected first value to a selected second value within a selected first interval of time, the difference between the output voltage of rectifier 7a and the voltage drop across resistor 16a remaining greater than the output voltage of rectifier 7b until the end of said first selected interval of time, and the temperature of resistor 16a increasing until the end of said first selected interval of time.

At the end of said first selected time interval, the difference between the output voltage of rectifier 7a and the voltage drop across resistor 16a becomes the same as the output voltage of rectifier 7b. At this time, the increasing voltage drop across load 5 tends to increase the current through coil 17 and therefore cause further increase in the voltage drop across load 5 in a cumulative manner. As a result, the output voltage of rectifier 7b is driven to a value greater than the difference between the output voltage of rectifier 7a and the voltage drop across resistor 16a. Current ceases to flow through resistor 16a. The current output of rectifier 7b now flows through resistor 21a and coil 17.

When this change-over first takes place, the temperature of resistor 21a is at its minimum for the cycle of operation. The resistance of resistor 21a is sufficiently greater than that of coil 17, so that no substantial drop in the current through coil 17 takes place. Resistor 21a is of a selected type, and the dissipation of the heat of resistor 21a is such, that the output voltage of rectifier 7b at the instant of the change-over is insufficient to cause heating of said resistor 21a above said minimum temperature thereof.

At the time of the change-over, which is extremely rapid, the current in coil 17 is increasing, as previously stated. The resulting increasing current through load 5, with resulting increased voltage drop across load 5, results in an increased output voltage of rectifier 7b, and hence in further increase in the current through coil 17. The increase in the current through coil 17 and the increase in the load current are thereby mutually cumulative.

When the current through load 5 reaches a third selected value, the output voltage of rectifier 7b becomes sufficient to heat resistor 21a sufficiently to cause a drop in the resistance thereof. The drop in the resistance of resistor 21a tends to cause a decrease in the current through coil 17, tending to counteract the effect of the increase in load current. The current through load 5 reaches a selected maximum value, corresponding to which the current through coil 17 ceases to increase. The further heating of resistor 21a and resulting drop in the resistance thereof, causes the current through coil 17 to begin to drop. As a result, the current through load 5 drops. The resulting decrease in the voltage drop across load 5 results in a further, co-acting decrease in the current through coil 17.

When the current through load 5 decreases to a further selected value, the output voltage of rectifier 7b becomes insufficient to cause further heating of resistor 21a; and in fact, resistor 21a cools toward its initial temperature. However, there continue to be co-acting decreases in the voltage drop across load 5 and the current through coil 17, and the load current continues to drop.

In the meantime, resistor 16a has cooled to its initial temperature. Therefore, the current through load 5 must decay to its initial value before the output voltage of rectifier 7a, less the voltage drop across resistor 16a corresponding to said initial load current, exceeds the output voltage of rectifier 7b, whereby the cycle is reinitiated.

While I have disclosed preferred embodiments of my invention and have indicated various changes, omissions and additions which may be made therein, it will be apparent that various other changes, omissions and additions may be made in my invention without departing from the scope and spirit thereof.

I have disclosed circuits utilizing temperature-sensitive resistors which are adapted to be heated by the passage of current therethrough. In certain applications, I optionally employ an external source of heat for heating a temperature-sensitive resistor in order to lower the resistance thereof. For example, in Fig. 1 a heater coil may be connected in parallel with resistor 16. As a further example, resistor 16 may be located at the focus of rays emitted by the reflector of a heat lamp, which may optionally be an incandescent lamp, which is placed in operation upon the closing of switch 8. Said lamp may also serve as the load in the circuit of Fig. 1.

Optionally, I provide external means for cooling a temperature-sensitive resistor when it is desired to return the resistance thereof to its value at ambient temperature.

As stated above, I can employ temperature-sensitive resistors having a positive temperature coefficient of resistance. For example, in Fig. 1, resistor 16 may have a positive temperature coefficient of resistance. In one application, in the starting of a motor, switch 8 is initially closed and resistor 16 virtually short circuits coil 17. The current through coil 17 is low, and the current through load 5 is low. As resistor 16 is heated, its resistance rises, the current through coil 17 rises and the load current rises. Optionally, a relay similar to relay 22 may be connected across load 5 and coupled to switch 8 for opening same when the voltage drop across load 5 reaches a predetermined value.

In Fig. 2, also, resistor 21 may have a positive temperature coefficient of resistance. In one application, in the dimming of electric lamps, switch 8 may be a normally closed shorting switch across resistor 21, instead of being connected in series between resistor 21 and coil 17. Initially, the current through coil 17 is relatively high, and the load current is relatively high. When switch 8 is opened, resistor 21 is heated and its resistance rises. Therefore, the current through coil 17 drops and the load current drops.

In Fig. 3, resistors 16 and 21 may both have positive temperature coefficients of resistance. In this case, switch contacts 43, 44 and 41, 42 are normally closed, and switch contacts 31, 32 are normally open. Initially, resistor 16 is in circuit across coil 17 and the load current is low. As resistor 16 is heated, its resistance rises, the current through coil 17 rises and the load current rises. When the voltage drop across load 5 rises sufficiently, relay coil 38 is energized so as to open contacts 43, 44 and 41, 42 and to close contacts 31, 32.

Resistor 21 is now in circuit in series with coil 17. As resistor 21 is heated, its resistance rises, the current through coil 17 drops and the load current drops. When the voltage across load 5 drops sufficiently, the switch contacts return to their initial condition.

In Fig. 4, resistors 16a and 21a may both have positive temperature coefficients of resistance. In this modification, resistor 16a is connected across terminals 11a and 12a, and resistor 21a is connected in series between terminal 11b and blocking diode 10b. Initially, the current through coil 17 is low and is supplied by rectifier 7a, and the current through load 5 is low. As resistor 16a is heated, its resistance rises and the current through coil 17 rises. The current through load 5 rises, and the voltage drop across load 5 rises until rectifier 7b becomes the source of current supply for coil 17. The current through coil 17 continues to rise, and the load current continues to rise. Finally, resistor 21a is heated by the passage of current therethrough, and its resistance rises. This causes the current through coil 17 and the load current to drop. Even when resistor 21a begins to cool again, the drop in current through coil 17 and the drop in load current continue to be mutually cumulative until the voltage drop across load 5 decreases sufficiently so that rectifier 7a again becomes the source of current supply for coil 17.

It will also be apparent that each of the circuits of Figs. 3 and 4 may be suitably modified to utilize one resistor having a negative temperature coefficient of resistance and one resistor having a positive temperature coefficient of resistance.

Optionally, in any of the embodiments, a resistor having a negative temperature coefficient of resistance may be normally maintained at ambient temperature, or may be normally maintained at a temperature in excess of ambient temperature by the application of external heat thereto. When the resistor is placed in circuit, external means may be simultaneously actuated to cool the resistor below its normal temperature. In this modification, the action of the resistor is similar to the previously described action of a resistor having a positive temperature coefficient of resistance.

The above-listed modifications are merely illustrative of the various possible modifications of my invention.

I claim:

1. A device for varying the flow of current from a voltage source through a load, said device comprising a first electro-magnetically variable impedance which is adapted to be connected in circuit with said voltage source and said load for controlling the current flow through said load, a second impedance, electro-magnetic means coupling said second impedance and said first impedance, whereby current applied to said second impedance is determinative of the value of said first impedance and hence determinative of the value of the load current, a further voltage source which is effective to supply a selected direct voltage during a selected time interval, and circuit means including a third impedance at selected initial temperature for coupling said further voltage source to said second impedance during said selected time interval to determine a selected initial value of the load current, said third impedance being adapted to be heated above said selected initial temperature by the passage of current therethrough and the impedance thereof varying according to its temperature, whereby the load current varies substantially continuously during said selected time interval and reaches a selected terminal value at the conclusion of said selected time interval.

2. A device for varying the flow of current from an alternating voltage source through a load, said device comprising a reactor, said reactor comprising at least one reactance coil which is adapted to be connected in circuit with said voltage source and said load for controlling the current flow through said load, a direct current reactance coil, electro-magnetic means coupling said direct current coil to said first-mentioned reactance coil, whereby direct current applied to said direct current coil is determinative of the reactance of said first-mentioned reactance coil and hence determinative of the value of the load current, a direct voltage source which is effective to apply a selected direct voltage during a selected time interval, and circuit means including a resistor at selected initial temperature for coupling said direct voltage source to said direct current coil during said selected time interval to determine a selected initial value of the load current, said resistor being adapted to be heated above said selected initial temperature by the passage of current therethrough and the resistance thereof varying according to its temperature, whereby the load current varies substantially continuously during said selected time interval and reaches a selected terminal value at the conclusion of said selected time interval.

3. A device in accordance with claim 2, in which said resistor has a negative temperature coefficient of resistance and is adapted to be connected in parallel with said direct current coil, whereby the load current decreases when said load and said first-mentioned reactance coil are connected in series across an alternating voltage source.

4. A device in accordance with claim 2, in which said resistor has a negative temperature coefficient of resistance and is adapted to be connected in series with said direct current coil and said source of direct current, whereby the load current increases when said load and said first-mentioned reactance coil are connected in series across an alternating voltage source.

5. A device in accordance with claim 4, said device also including a relay coil connected in parallel with said load and relay means controlled by said relay coil and adapted to short circuit said resistor when the voltage drop across said load when connected in series with said first-mentioned reactance coil across an alternating voltage source increases to a predetermined maximum.

6. A device in accordance with claim 4, said device also including a second resistor having a negative temperature coefficient of resistance, said second resistor being adapted to be connected in said circuit means so as to be in parallel with said direct current coil and being also adapted to be heated by the passage of said direct current therethrough whereby to vary the resistance thereof, whereby the load current decreases when said load and said first-mentioned reactance coil are connected in series across an alternating voltage source, and means for alternately and cyclically connecting said resistors in said circuit means whereby said first resistor is connected in said circuit means when the impedance of said first-mentioned reactance coil rises to a selected value, and said second resistor is connected in said circuit means when the impedance of said first-mentioned reactance coil drops to a selected value.

7. A device in accordance with claim 4, in which said first-mentioned reactance coil and said load are connected in series, said device also comprising a second direct voltage source, second circuit means coupling said second direct voltage source to said direct current coil for applying a selected direct current thereto whereby a selected current passes through said load, a second resistor having a negative temperature coefficient of resistance, said second resistor being adapted to be connected in said second circuit means so as to be in parallel with said direct current coil and being also adapted to be heated by the passage of the direct current therethrough whereby to vary the resistance thereof, whereby the load current decreases when said load and said first-mentioned reactance coil are connected across an alternating voltage source, said first-mentioned direct voltage source being a first rectifier having input terminals coupled to said reactance coil and having two output terminals, said first-mentioned circuit means including current-blocking means, one of said output terminals being connected through said first-mentioned resistor to one side of said current-blocking means which permit current flow only in the direction permitted by said first rectifier, the other side of said current-blocking means being connected to a first terminal of said direct current coil, the other terminal of said direct current coil being connected to the other output terminal of said first rectifier, said second direct voltage source being a second rectifier having input terminals coupled to said load and having two output terminals, and second resistor being connected between said output terminals of said second rectifier, said second circuit means including further current-blocking means, one of said output terminals of said second rectifier being connected to one side of said further current-blocking means which permit current flow through said direct current coil only in the direction permitted by said second rectifier, the other side of said further current-blocking means being connected to said first terminal of said direct current coil, the other terminal of said direct current coil being connected to the other output terminal of said second rectifier.

8. A device for cyclically varying a load current between maximum and minimum values, comprising a pair of lines adapted to be connected to the respective sides of a source of alternating current voltage, a saturable reactor comprising a core and two reactance coils and a direct current coil mounted on said core, a load, said reactance coils and said load being all connected in series between said lines, a rectifier having a pair of input terminals respectively connected to respective lines, and a pair of output terminals, a voltage divider connected across said output terminals and having one terminal connected to one terminal of said direct current coil and a pair of taps intermediate its terminals, a normally closed switch, a first resistor, one of said taps being connected through said normally closed switch and said first resistor in series to the other terminal of said direct current coil, a second resistor of fixed resistance, a first normally open switch, the other of said taps being connected through said first normally open switch to said second resistor and thence to said other terminal of said direct current coil, a third resistor, a second normally open switch, said terminals of said direct current coil being also connected to each other by said third resistor and said second normally open switch in series, and switch-operating means coupling said load and said switches for opening said normally closed switch and closing said normally open switches when the voltage drop across said load reaches a selected maximum value, and for permitting said switches to return to their normal positions when the voltage drop across said load drops to a selected minimum value, each of said first and third resistors having a respective selected negative temperature coefficient of resistance, said third resistor being heated above ambient temperature by the passage of current therethrough after the closing of said normally open switches whereby to reduce the current through said direct current coil and thereby reduce the magnetic flux in said core and thereby increase the impedance of said reactance coils to a selected value whereby to reduce said voltage drop across said load to said selected minimum value, said first resistor being heated above ambient temperature by the passage of current therethrough after the opening of said normally open switches whereby to increase the current through said direct current coil and thereby increase the magnetic flux in said core and thereby reduce the impedance of said reactance coils to a selected value whereby to increase said voltage drop across said load to said selected maximum value, said resistors respectively cooling to ambient temperature while out of circuit.

9. A device in accordance with claim 8, in which said load comprises a plurality of incandescent lamps.

10. A device in accordance with claim 8, in which said load comprises a plurality of fluorescent lamps.

11. A device in accordance with claim 2, in which said resistor has a positive temperature coefficient of resistance and is adapted to be connected in parallel with said direct current coil, whereby the load current increases when said load and said first-mentioned reactance coil are connected in series across an alternating voltage source.

12. A device in accordance with claim 2, in which said resistor has a positive temperature coefficient of resistance and is adapted to be connected in series with said direct current coil and said source of direct current, whereby the load current decreases when said load and said first-mentioned reactance coil are connected in series across an alternating voltage source.

13. A device for varying the flow of current from an alternating voltage source through a load, said device comprising a reactor, said reactor comprising at least one reactance coil which is adapted to be connected in circuit with said voltage source and said load for controlling the current flow through said load, a direct current reactance coil, electro-magnetic means coupling said direct current coil to said first-mentioned reactance coil, a direct voltage source, circuit means coupling said direct voltage source to said direct voltage coil for applying a selected direct current thereto whereby a selected current passes through said load, a resistor adapted to be connected in said circuit means and whose resistance varies according to its temperature, and further means for varying the temperature of said resistor when said resistor is connected in said circuit means, whereby to vary the resistance of said resistor and thereby vary the current applied to said direct current coil and vary the current through said load.

14. A device in accordance with claim 13, in which said further means are air-cooling means.

15. A device in accordance with claim 13, in which said further means are heater coil means connected in said circuit means.

16. A signal input circuit for an electric amplifier device, comprising a source of voltage which is effective to apply a selected voltage during a selected time interval, and circuit means for coupling said source of voltage to the input of said device, said circuit means including a first impedance having a negative temperature coefficient of impedance and a second impedance for limiting the flow of current through said first impedance, said first impedance being adapted to have a selected initial temperature to determine a selected initial output of said device and being adapted to be heated above its initial temperature by the passage of current therethrough, the output of said device varying substantially continuously during said selected time interval and reaching a selected terminal value at the conclusion of said selected time interval.

17. A signal input circuit for an electric amplifier device, comprising a source of voltage which is effective to apply a selected voltage during a selected time interval, and circuit means for coupling said source of voltage to the input of said device, said circuit means including a first resistance having a negative temperature coefficient of resistance and a second resistance for limiting the flow of current through said first resistance, said first resistance being adapted to have a selected initial temperature to determine a selected initial output of said device and being adapted to be heated above its initial temperature by the passage of current therethrough, the output of said device varying substantially continuously during said selected time interval and reaching a selected terminal value at the conclusion of said selected time interval.

18. A device for varying the flow of current from an alternating voltage source through a load, said device comprising a reactor, said reactor comprising at least one reactance coil which is adapted to be connected in circuit with said voltage source and said load for controlling the current flow through said load, a direct current reactance coil, electro-magnetic means coupling said direct current coil to said first-mentioned reactance coil, whereby direct current applied to said direct current coil is determinative of the reactance of said first-mentioned reactance coil and hence determinative of the value of the load current, a source of direct voltage which is effective to supply a selected direct voltage during a selected time interval, and circuit means including a resistor at selected initial temperature for coupling said direct voltage source to said direct current coil during said selected time interval to determine a selected initial value of said load current, said resistor being adapted to be heated above said selected temperature by the passage of current therethrough and the resistance of said resistor varying in proportion to its temperature, whereby the said load current varies substantially continuously during said selected time interval and reaches a selected terminal value at the conclusion of said selected time interval.

19. A device for varying the flow of current from an alternating voltage source through a load, said device comprising an electric current amplifier whose output is adapted to be connected in circuit with said voltage source and said load for controlling the current flow through said load, a further voltage source which is effective to supply a selected voltage during a selected time interval, and circuit means including an impedance at selected initial temperature for coupling said further voltage source to the input of said current amplifier, said impedance being adapted to be heated above said selected initial temperature by the passage of current therethrough from said further voltage source and the impedance thereof varying according to its temperature, the output current of said current amplifier varying substantially continuously during said selected time interval and reaching a selected terminal value at the conclusion of said selected time interval.

20. A signal input device for an electric amplifier device, comprising a source of voltage which is effective to apply a selected voltage during a selected time interval, and circuit means including an impedance at selected initial temperature for coupling said voltage source to the input of said device, said impedance being adapted to be heated above said selected initial temperature by the passage of current therethrough from said voltage source and the impedance thereof varying according to its temperature, the output of said device varying substantially continuously during said selected time interval and reaching a selected terminal value at the conclusion of said selected time interval.

References Cited in the file of this patent

UNITED STATES PATENTS

| | | |
|---|---|---|
| Re. 22,768 | Lamm et al. | June 25, 1946 |
| 2,458,277 | Lark et al. | Jan. 4, 1949 |
| 2,486,250 | Bixby | Oct. 25, 1949 |
| 2,539,111 | Avidsson et al. | Jan. 23, 1951 |
| 2,558,086 | Herchenroeder | June 26, 1951 |
| 2,665,394 | Avidsson et al. | Jan. 5, 1954 |